(12) United States Patent
Kiyota et al.

(10) Patent No.: US 11,915,841 B2
(45) Date of Patent: Feb. 27, 2024

(54) METHOD OF MANUFACTURING WIRE HARNESS

(71) Applicant: Yazaki Corporation, Tokyo (JP)

(72) Inventors: Hirotaka Kiyota, Makinohara (JP); Masaru Kiuchi, Makinohara (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 17/579,201

(22) Filed: Jan. 19, 2022

(65) Prior Publication Data

US 2022/0262547 A1 Aug. 18, 2022

(30) Foreign Application Priority Data

Feb. 15, 2021 (JP) ................................. 2021-021619

(51) Int. Cl.
*H01B 13/012* (2006.01)
*H01B 13/22* (2006.01)
(Continued)

(52) U.S. Cl.
CPC ..... *H01B 13/01263* (2013.01); *H01B 7/0045* (2013.01); *H01B 13/227* (2013.01);
(Continued)

(58) Field of Classification Search
CPC .............. H01B 13/01263; H01B 13/22; H01B 13/227; H01B 7/0045; H02G 3/0462;
(Continued)

(56) References Cited

U.S. PATENT DOCUMENTS 4,929,478 A * 5/1990 Conaghan ............ H02G 3/0462
428/36.1
5,627,343 A * 5/1997 Brandolf ............ H02G 15/1806
174/DIG. 8
(Continued)

FOREIGN PATENT DOCUMENTS

JP 2014073637 A * 4/2014
JP 2015-19527 A 1/2015
(Continued)

OTHER PUBLICATIONS

Suzuki et al., "Development of cold-shrinkable joints with carrier pipes for EHV cables," 2000 Power Engineering Society Summer Meeting (Cat. No.00CH37134), Seattle, WA, 2000, pp. 469-474, vol. 1. (Year: 2000).*

*Primary Examiner* — A. Dexter Tugbang
(74) *Attorney, Agent, or Firm* — Sughrue Mion, PLLC

(57) ABSTRACT

A method of manufacturing a wire harness having an electric wire and a protection tube covering, one end side of the electric wire being provided with a large-dimension portion greater than an inner dimension of the protection tube, including shaping the electric wire protection tube made of shape-memory polymer into a tube shape; expanding the protection tube by heating to a temperature equal to or higher than a glass-transition point such that the inner dimension of the protection tube becomes larger than the large-dimension portion; cooling the protection tube to a temperature below the glass-transition point and solidifying the protection tube; passing the large-dimension portion and the electric wire inside the protection tube; and reheating the electric wire protection tube to a temperature equal to or higher than the glass-transition point such that the electric wire protection tube is restored to the inner dimension obtained after the step of shaping.

3 Claims, 8 Drawing Sheets

(51) Int. Cl.
  *H01B 7/00*    (2006.01)
  *H02G 3/04*    (2006.01)
  *B60R 16/02*   (2006.01)
  *H02G 15/18*   (2006.01)
  *C08G 18/08*   (2006.01)

(52) U.S. Cl.
  CPC ........ *H02G 3/0462* (2013.01); *B60R 16/0215* (2013.01); *C08G 18/0895* (2013.01); *H01B 13/22* (2013.01); *H02G 3/0468* (2013.01); *H02G 3/0481* (2013.01); *H02G 15/1806* (2013.01)

(58) Field of Classification Search
  CPC ............... H02G 3/0468; H02G 3/0481; H02G 15/1806; B60R 16/0215; C08G 18/0895
  See application file for complete search history.

(56) References Cited

U.S. PATENT DOCUMENTS

2013/0180776 A1    7/2013  Gotou et al.
2016/0365170 A1*  12/2016  Wakabayashi ...... B60R 16/0215
2017/0008998 A1*   1/2017  Sodano .............. C08G 18/0895

FOREIGN PATENT DOCUMENTS

JP    2016-46914 A    4/2016
JP    2016-110880 A   6/2016

\* cited by examiner

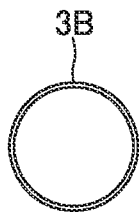 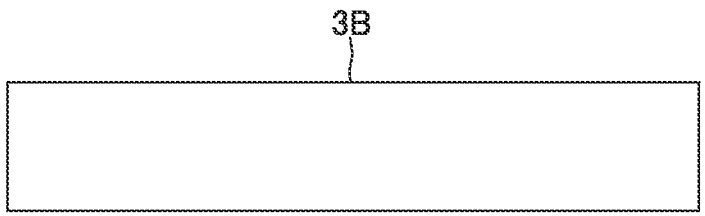
FIG.8A  FIG.8B
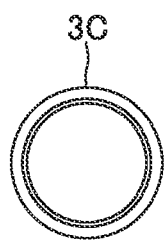 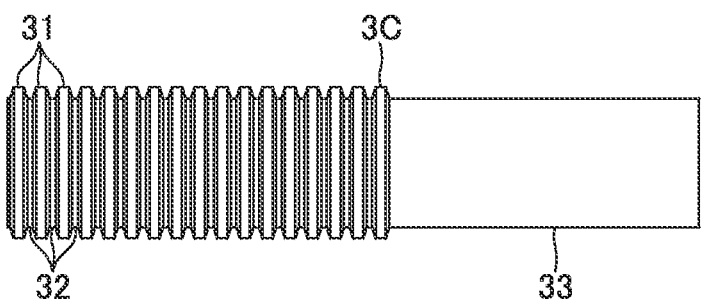
FIG.9A  FIG.9B
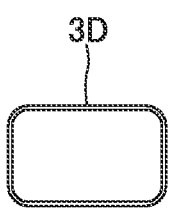 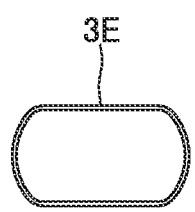 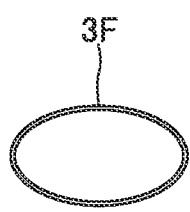 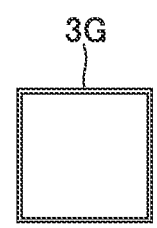 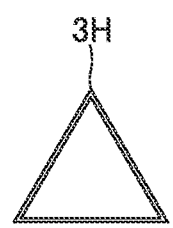
FIG.10

METHOD OF MANUFACTURING WIRE HARNESS

TECHNICAL FIELD

The present invention relates to a wire harness and a method of manufacturing the wire harness.

BACKGROUND

A wire harness to be wired in a vehicle includes a plurality of electric wires, a terminal fitting connected to an end of each electric wire, a connector housing accommodating the terminal fitting, and a protection tube covering the electric wire, and the like.

In a process of manufacturing the wire harness, in some cases the protection tube is applied to the electric wire which has been connected to a connector or the like, in other words the protection tube is applied afterward. In this instance, if an outer dimension of the connector or the like is greater than an inner dimension of the protection tube and the connector cannot be passed inside the protection tube, then a protection tube having a slit is used such that the slit is widened to mount the protection tube on the electric wire. After the protection tube has been mounted on the electric wire, a tape is wound on an outer periphery of the protection tube so that the electric wire does protrude out from the slit.

As described above, using the protection tube having the slit requires cumbersome operations such as widening the slit to mount the protection tube on the electric wire and winding the tape around the outer periphery of the protection tube. As a technique for eliminating these cumbersome operations, Patent Document 1 discloses a protector 503 constituted of a shape-memory polymer which covers, in a scroll shape, a group of electric wires 502, as shown in FIG. 14.

This protector 503 is formed by shaping the shape-memory polymer into a scroll shape having an overlapped wound portion which can cover the group of electric wires 502, and after the shaping, it is unrolled to a flat plate shape while being heated to a temperature equal to or higher than a glass-transition point. Then, the group of electric wires 502 is placed on the unrolled protector 503, and the protector 503 is heated again to a temperature equal to or higher than the glass-transition point such that it is restored to its original scroll shape and becomes in a form shown in FIG. 14.

PRIOR ART DOCUMENT

Patent Document 1: JP 2016-110880 A

SUMMARY OF THE INVENTION

Problem to be Solved by the Invention

The wire harness 501 with the group of electric wires 502 covered by the protector 503 as shown in FIG. 14 has a merit that it is possible to eliminate the tape winding since the protector 503 includes the overlapped wound portion, but on the other hand it has a demerit that this overlapped wound portion causes an increase in weight.

In addition, when the wire harness 501 is vibrated while an end portion 531 of the protector 503 is in contact with the electric wires 502, a cover of the electric wire 502 may be scraped and removed. Further, when using an electric wire which is thinner than the electric wire 502 shown, such electric wire may enter between the overlapped wound portion (i.e., an outer peripheral portion) of the protector 503 and an inner peripheral portion thereof and may be crashed.

An object of the present invention is thus to provide a solution which does not require cumbersome operations when mounting the protection tube on the electric wire that is being connected to a connector or the like during the process of manufacturing the wire harness, and which can improve quality of the wire harness as a finished product.

Solution to the Problem

In order to achieve the above-described object, a method of manufacturing a wire harness according to the present invention is a method of manufacturing a wire harness that includes an electric wire and an electric wire protection tube covering the electric wire, one end of the electric wire being provided with a large-dimension portion having a dimension larger than an inner dimension of the electric wire protection tube, the method including mounting the electric wire protection tube on the electric wire via steps, performed in a sequence set forth, of shaping the electric wire protection tube made of shape-memory polymer into a tube shape, expanding the electric wire protection tube which is heated to a temperature equal to or higher than a glass-transition point such that an inner dimension of the electric wire protection tube becomes larger than the large-dimension portion, while the electric wire protection tube is in an expanded state, cooling the electric wire protection tube to a temperature below the glass-transition point and solidifying the electric wire protection tube, mounting the electric wire protection tube on the electric wire by passing the large-dimension portion and the electric wire inside the electric wire protection tube, and reheating the electric wire protection tube to a temperature equal to or higher than the glass-transition point such that the electric wire protection tube is restored to the inner dimension obtained after the step of shaping.

A wire harness of the present invention includes an electric wire, an electric wire protection tube covering the electric wire, and large-dimension portions provided at both end sides of the electric wire, respectively, and each having a dimension larger than an inner dimension of the electric wire protection tube, wherein the electric wire protection tube is constituted of shape-memory polymer and is devoid of a cut and a seam.

Advantageous Effect of the Invention

According to the present invention, cumbersome operations are no longer required when mounting the protection tube on the electric wire that is being connected to the connector or the like during the process of manufacturing the wire harness, and further, quality of the wire harness as a finished product can be improved.

BRIEF DESCRIPTION OF THE DRAWINGS

FIG. 8A and FIG. 8B illustrate a modified example of the electric wire protection tube of FIG. 1, FIG. 8A being a front view and FIG. 8B being a plan view;

FIG. 9A and FIG. 9B illustrate another modified example of the electric wire protection tube of FIG. 1, FIG. 9A being a front view and FIG. 9B being a plan view;

FIG. 10 shows front views of still another modified examples of the electric wire protection tube of FIG. 1;

DETAILED DESCRIPTION OF THE EXEMPLARY EMBODIMENTS

First Embodiment

A wire harness and a method of manufacturing the wire harness according to a first embodiment of the present invention will be described with reference to FIG. 1 to FIG. 5.

Figure 1:
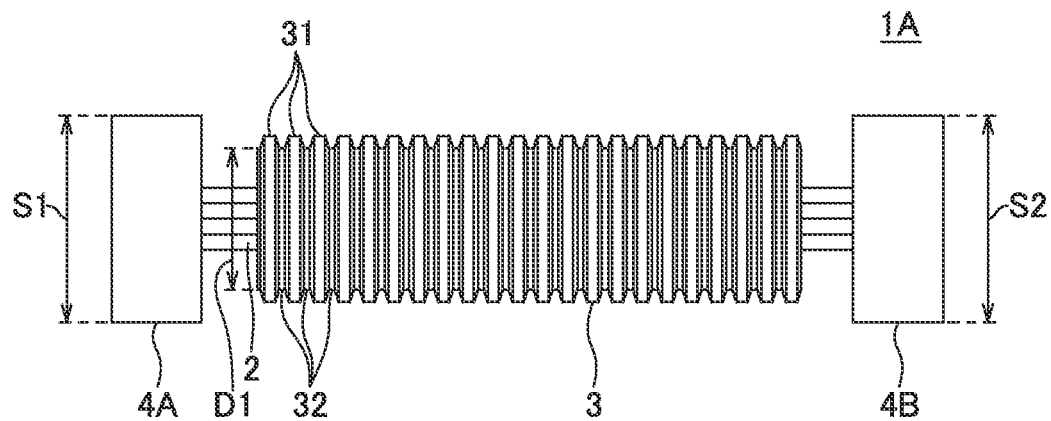
FIG. 1 is a plan view of a wire harness according to a first embodiment of the present invention.

A wire harness 1A shown in FIG. 1 is a wire harness configured to be wired in a vehicle. The wire harness 1A includes a group of electric wires 2, an electric wire protection tube 3 covering said group of electric wires 2, and connectors 4A, 4B provided at both end portions of the group of electric wires 2.

Each electric wire 2 is a covered electric wire that includes a core wire covered with an insulation cover.

The electric wire protection tube 3 is constituted of shape-memory polymer. The shape-memory polymer has a property of becoming soft at a temperature equal to or higher than a glass-transition point (Tg) and becoming rigid so a shape thereof is fixed when its temperature decreases below the glass-transition point. The shape-memory polymer further has a property that it memorizes a shape initially given (hereinafter, this memorized shape is referred to as "shape-memory shape"), and that, after it is deformed due to applied force, when it is heated again to a temperature equal to or higher than the glass-transition point, it is restored by itself to the shape-memory shape.

Figure 3:
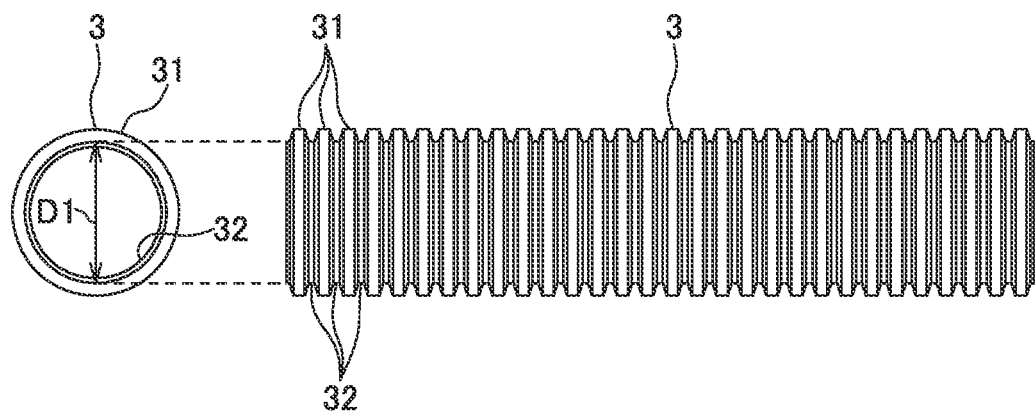
FIG. 3 illustrates an electric wire protection tube of FIG. 1 in a front view (left side) and a plan view (right side)

As shown in FIG. 3, the electric wire protection tube 3 of the shape-memory shape is formed into a corrugated-tube shape including continuously and alternately arranged crests 31 and troughs 32, and the electric wire protection tube 3 is flexible. The electric wire protection tube 3 does not have a cut (slit) and a seam (i.e., a line of junction where cut portions are joined).

In the present invention, the material and the glass-transition point of the shape-memory polymer constituting the electric wire protection tube 3 can be configured arbitrarily. For example, for the wire harness 1A of this embodiment, since it is intended to be wired in a vehicle, the glass-transition point may appropriately be higher than an ambient temperature in an environment where it is wired in a vehicle body.

Connectors 4A, 4B are each constituted of terminal fittings to be connected to ends of respective electric wires 2, and a connector housing made of synthetic resin accommodating the terminal fittings. The connectors 4A, 4B are not covered by the electric wire protection tube 3 and are exposed.

Figure 2:
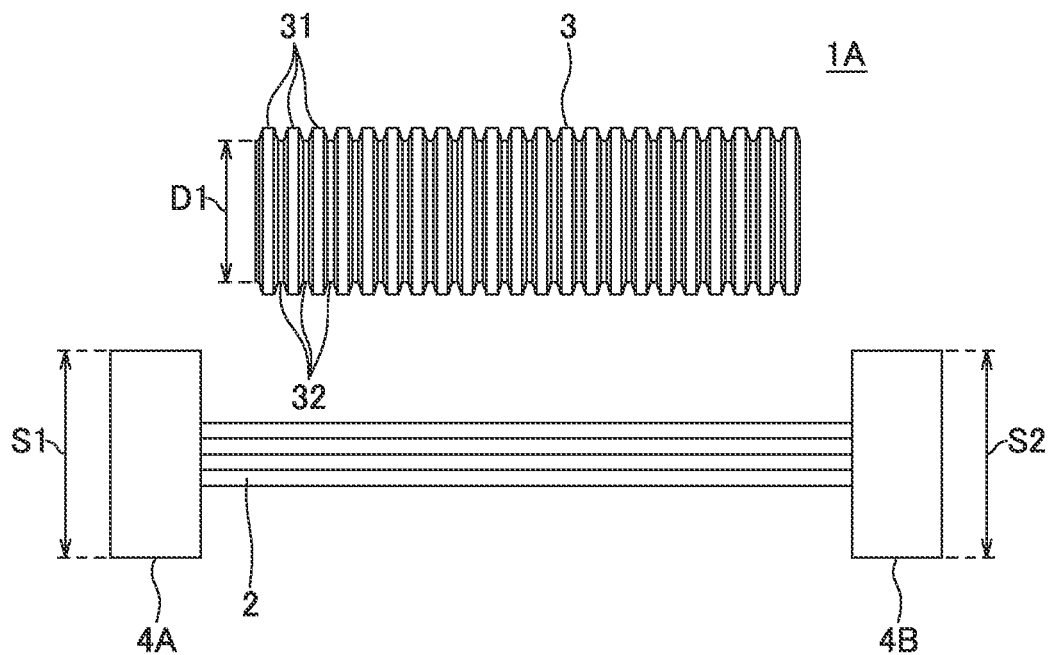
FIG. 2 is an exploded view of the wire harness of FIG. 1.

As shown in FIG. 1 and FIG. 2, outer dimensions S1, S2 (S1=S2) of the connectors 4A, 4B in a direction perpendicular to the electric wires 2 is greater than an inner dimension D1 (i.e., a diameter of the trough 32) of the electric wire protection tube 3 of the shape-memory shape. Thus, the group of electric wires 2 which is being connected to the connectors 4A, 4B cannot be passed inside the electric wire protection tube 3 of the shape-memory shape, even by e.g., changing an angle of the connectors 4A, 4B. The connector 4A, 4B corresponds to "large-dimension portion" in claims.

Next, a method of manufacturing the above-described wire harness 1A will be described. A method of manufacturing the wire harness 1A of this embodiment is a method of mounting the electric wire protection tube 3 on the group of electric wires 2 which has been connected to the connectors 4A, 4B, i.e., a method of mounting the electric wire protection tube 3 afterword.

Figure 5:
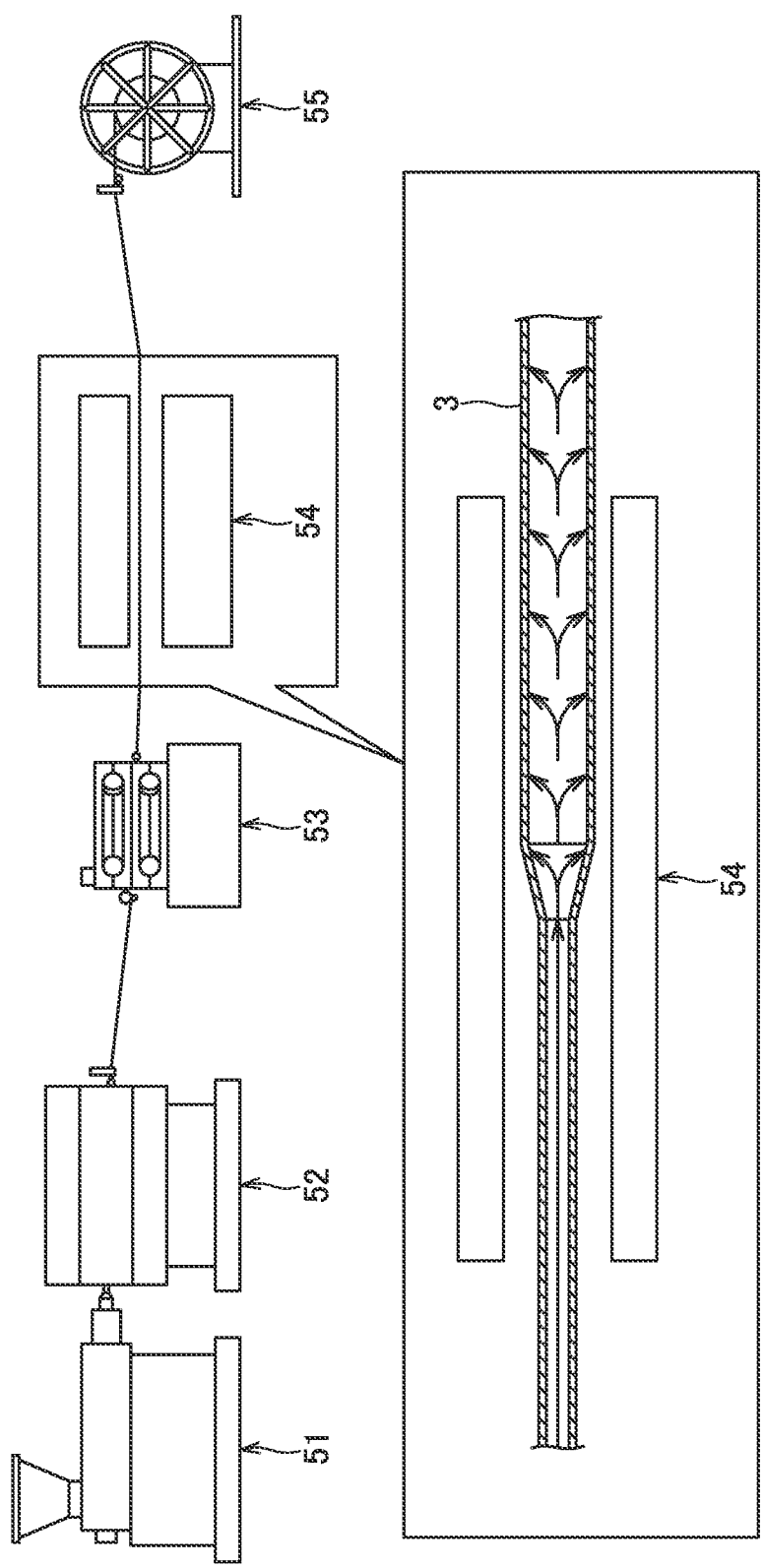
FIG. 5 is a diagram for illustrating one example of a method of manufacturing the electric wire protection tube of FIG. 1.

The electric wire protection tube 3 is manufactured by a manufacturing installation shown in FIG. 5. An extruder 51 of FIG. 5 is configured to heat and plasticize charged pellet-like shape-memory polymer and to extrude it in a tube shape. A shaping machine 52 is configured to form protrusions and recesses, i.e., the crests 31 and the troughs 32, on a tube-shaped body extruded from the extruder 51. The tube-shaped body that has passed through the shaping machine 52 is cooled and solidified until it is taken into a take-in machine 53, thereby the tube-shaped body is shaped as the electric wire protection tube 3 of the shape-memory shape (a step of shaping).

A heater 54 disposed downstream of the take-in machine 53 is configured to heat the electric wire protection tube 3 to a temperature equal to or higher than the glass-transition point. The manufacturing installation of FIG. 5 is further provided with an air feeder not shown for blowing compressed air in the electric wire protection tube 3 while it is being passed through the heater 54, as indicated by arrows. During this time, a tip of the electric wire protection tube 3 (i.e., an end thereof located on a side of a winder 55) is sealed. Thus, the electric wire protection tube 3 becomes inflated due to the compressed air blown therein, and the inner dimension thereof is expanded to the inner dimension D2 which is larger than the outer dimensions S1, S2 of the connectors 4A, 4B (a step of expanding).

The electric wire protection tube 3 which has been expanded as described above is cooled to a temperature below the glass-transition point and solidified until it is wound on the winder 55 (a step of cooling), and then the electric wire protection tube 3 is wound on the winder 55 while keeping its expanded shape.

Figure 4:
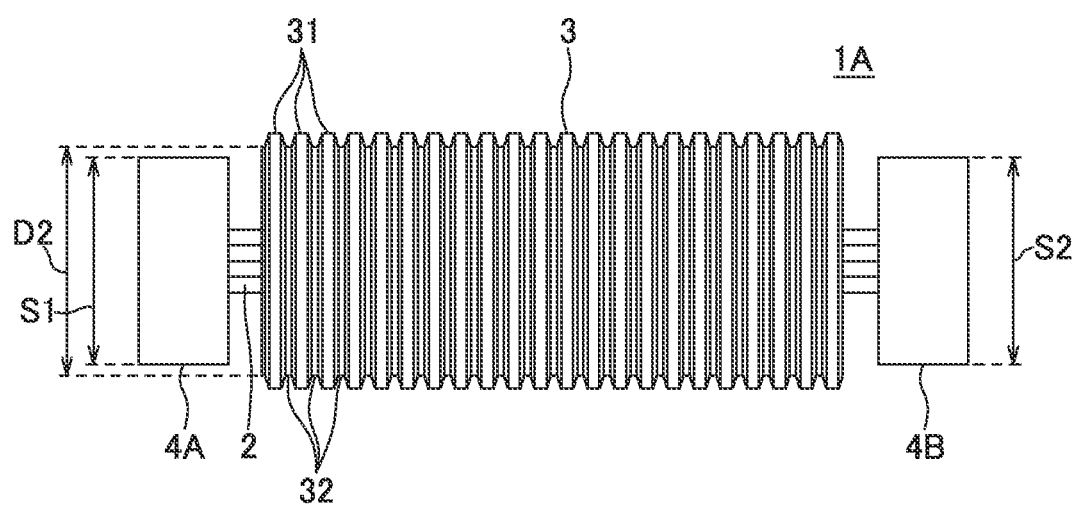
FIG. 4 is a diagram for illustrating a method of manufacturing the wire harness of FIG. 1.

Subsequently, the electric wire protection tube 3 of the expanded shape that is drawn out from the winder 55 is cut to a predetermined length, and, as shown in FIG. 4, the group of electric wires 2 that is being connected to the connectors 4A, 4B is inserted into said electric wire protection tube 3 (a step of mounting). At this time, since the inner dimension D2 of the electric wire protection tube 3 is larger than the outer dimensions S1, S2 of both connectors 4A, 4B, the electric wire protection tube 3 can be mounted on the group of electric wires 2 by passing the connector 4A and the group of electric wires 2 inside the electric wire protection tube 3, or alternatively, the electric wire protection tube 3 can be mounted on the group of electric wires 2 by passing the connector 4B and the group of electric wires 2 inside the electric wire protection tube 3.

The electric wire protection tube 3 that has been mounted on the group of electric wires 2 as described above is heated again by a heater not shown to a temperature equal to or higher than the glass-transition point, and the inner dimension of the electric wire protection tube 3 is restored to the inner dimension D1 of the shape-memory shape obtained before the expanding (a step of reheating). The wire harness 1A is manufactured via these steps.

According to the method of manufacturing the wire harness 1A of this embodiment, since the electric wire protection tube 3 that is expanded to the inner dimension larger than the outer dimensions of the connectors 4A, 4B is mounted on the group of electric wires 2, there is no need to form a slit on the electric wire protection tube 3, thus the electric wire protection tube 3 can be easily mounted on the group of electric wires 2. Further, since no slit is formed on the electric wire protection tube 3, it is possible to eliminate the tape winding operation as conventionally performed for preventing the electric wire from protruding out of the tube via the slit. In the wire harness 1A of this embodiment, however, a tape winding operation may be performed as needed to prevent the positional displacement between the electric wire protection tube 3 and the group of electric wires 2.

Figure 14:
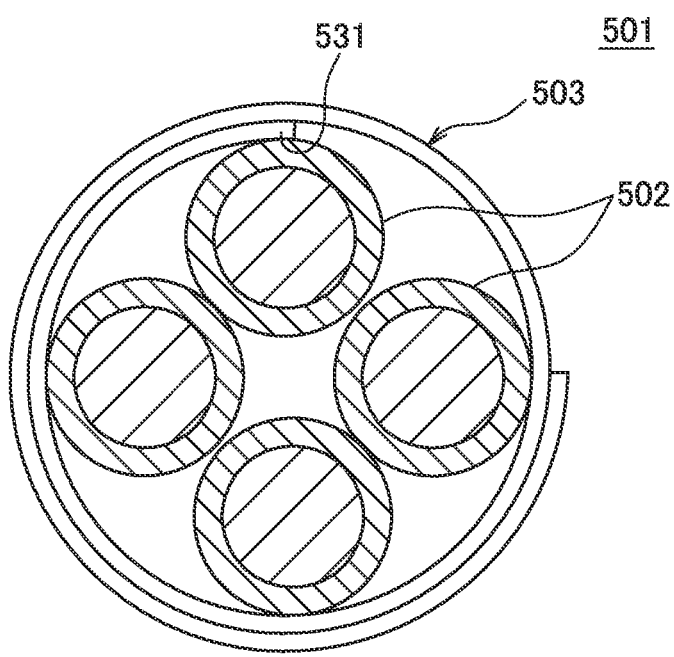
FIG. 14 is a cross-sectional view of a conventional wire harness.

Further, the wire harness 1A of the finished product is restored to the shape-memory shape in which the inner dimension of the electric wire protection tube 3 is smaller than the outer dimensions of the connectors 4A, 4B, thus the wire harness 1A can be wired through narrow wiring paths. Further, since the electric wire protection tube 3 is devoid of a slit or an edge (such as the end portion 531 in FIG. 14), damage to the cover of the electric wire can be prevented.

In the above-described wire harness 1A, the outer dimension S1 of the connector 4A and the outer dimension S2 of the connector 4B are equal to each other; however, for example in the case where the outer dimension of the connector 4A is smaller than the outer dimension of the connector 4B, the electric wire protection tube 3 may be expanded so that the inner dimension thereof becomes larger than the outer dimension of the connector 4A, and the connector 4A and the group of electric wires 2 may be passed inside the electric wire protection tube 3 to mount the electric wire protection tube 3 on the group of electric wires 2.

Figure 6:
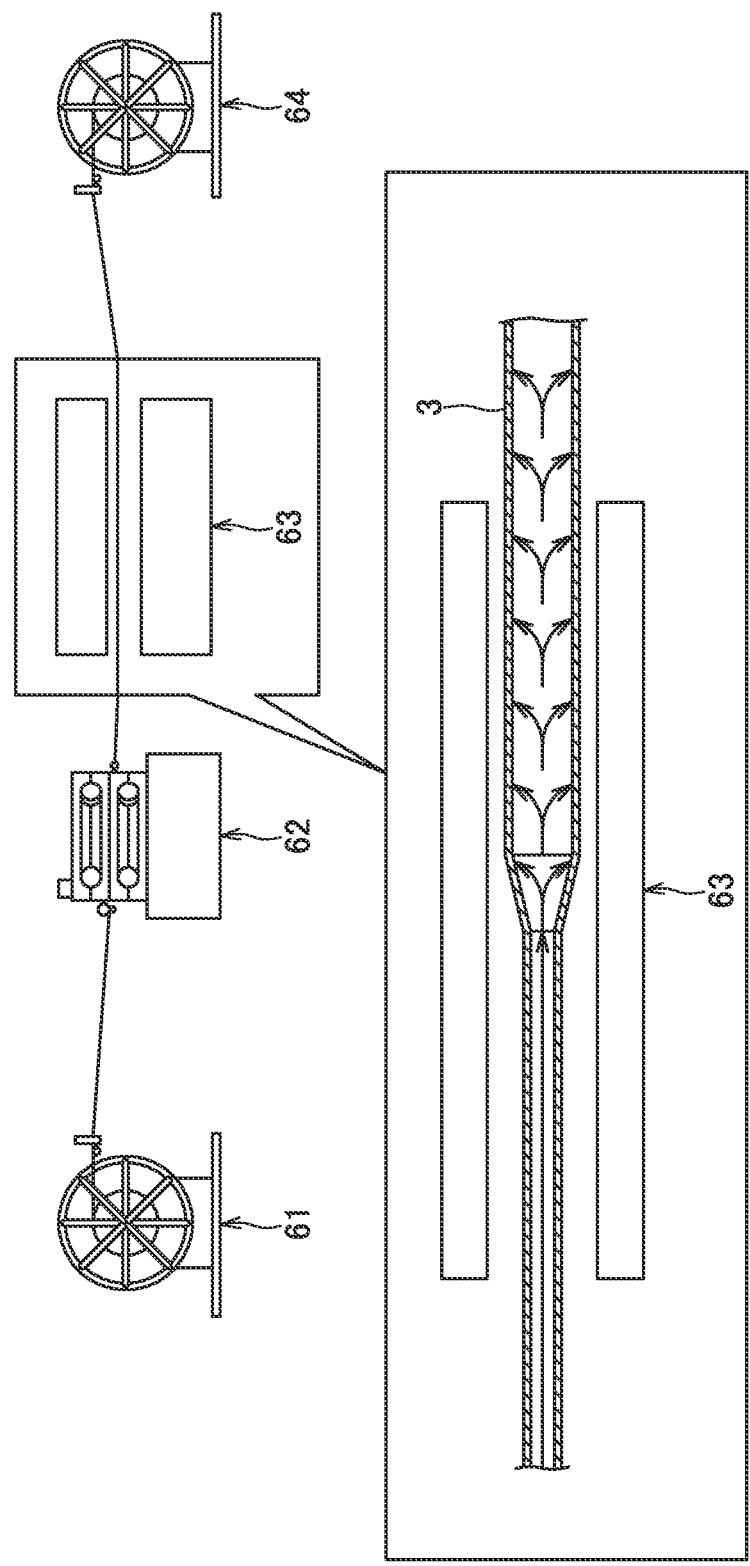
FIG. 6 is a diagram for illustrating another example of a method of manufacturing the electric wire protection tube of FIG. 1.

In the above-described manufacturing installation of FIG. 5, the steps of shaping and expanding the electric wire protection tube 3 are performed in the same line; however, the steps of shaping and expanding the electric wire protection tube 3 may be performed in separate lines as shown in FIG. 6.

On a drum 61 shown in FIG. 6, the electric wire protection tube 3 of the shape-memory shape is wound. This electric wire protection tube 3 is taken into a take-in machine 62 and supplied to a heater 63. In the step performed at the heater 63, which is the same as the step at the heater 54 of FIG. 5, while the electric wire protection tube 3 is heated to a temperature equal to or higher than the glass-transition point, the compressed air is blown into the electric wire protection tube 3 to expand the electric wire protection tube 3. This expanded electric wire protection tube 3 is cooled to a temperature below the glass-transition point and solidified until it is wound on a winder 64, and then the electric wire protection tube 3 is wound on the winder 64 while keeping its expanded shape.

Figure 7:
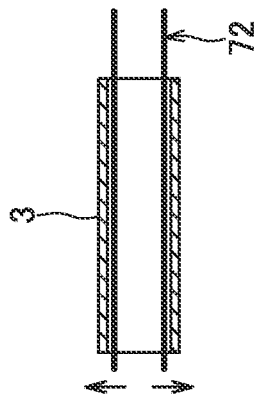
FIG. 7 is a diagram for illustrating still another example of a method of manufacturing the electric wire protection tube of FIG. 1.
Figure 7:
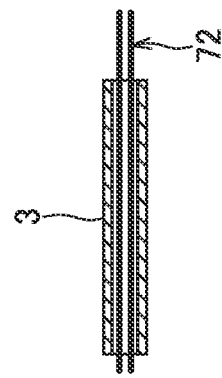
Figure 7:
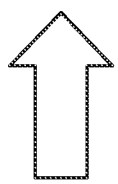
Figure 7:
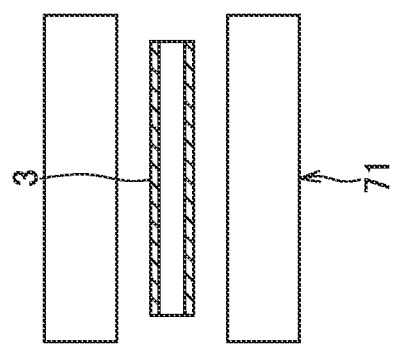

In the above-described manufacturing installations of FIG. 5 and FIG. 6, the electric wire protection tube 3 is expanded by blowing the compressed air into the electric wire protection tube 3; however, the step of expanding the electric wire protection tube 3 may be performed using a manufacturing installation shown in FIG. 7.

In the manufacturing installation of FIG. 7, the electric wire protection tube 3 of the shape-memory shape which has been cut to a predetermined length is heated by a heater 71 to a temperature equal to or higher than the glass-transition point. Then, an expander 72 is inserted into the heated electric wire protection tube 3, and the expander 72 is moved in an expanding direction to expand the electric wire protection tube 3.

In an alternate embodiment other than the one using the expander 72 of FIG. 7, the heated electric wire protection tube 3 may be expanded by pulling it from the outside.

Further, in the present invention, electric wire protection tubes 3B, 3C, 3D, 3E, 3F, 3G, 3H of the shape-memory shape shown in FIG. 8A to FIG. 10 other than the above-described electric wire protection tube 3 may be used. These electric wire protection tubes 3B, 3C, 3D, 3E, 3F, 3G, 3H are all constituted of shape-memory polymer.

The electric wire protection tube 3B shown in FIG. 8A and FIG. 8B is formed in the tube shape having an inner diameter and an outer diameter that are constant over the entire length. The electric wire protection tube 3C shown in FIG. 9A and FIG. 9B includes a corrugated tube-shaped portion where crests 31 and troughs 32 are arranged continuously and alternately and a straight portion 33 where an inner diameter and an outer diameter thereof are constant.

For the electric wire protection tubes 3, 3B, 3C described above, a cross section perpendicular to the axial direction is a shape of a perfect circle. For the electric wire protection tube 3D of FIG. 10, a cross section perpendicular to the axial direction is a shape of a rectangle. For the electric wire protection tube 3E of FIG. 10, a cross section perpendicular to the axial direction is a shape of an oval. For the electric wire protection tube 3F of FIG. 10, a cross section perpendicular to the axial direction is a shape of an ellipse. For the electric wire protection tube 3G of FIG. 10, a cross section perpendicular to the axial direction is a shape of a square. For the electric wire protection tube 3H of FIG. 10, a cross section perpendicular to the axial direction is a shape of an equilateral triangle.

Second Embodiment

Figure 11:
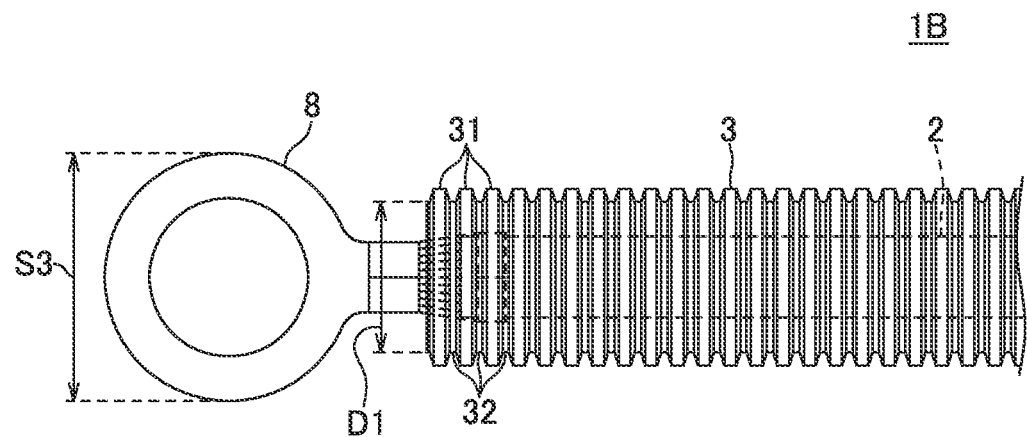
FIG. 11 is a plan view of a wire harness according to a second embodiment of the present invention.

A wire harness and a method of manufacturing the wire harness according to a second embodiment of the present invention will be described with reference to FIG. 11. In FIG. 11, the same elements as the first embodiment described above are provided with the same reference signs and explanations thereof are omitted.

A wire harness 1B shown in FIG. 11 is a wire harness configured to be wired in a vehicle. The wire harness 1B includes a single electric wire 2, an electric wire protection tube 3 covering the electric wire 2, a round terminal 8 connected to one end of the electric wire 2, and a large-dimension portion not shown provided at the other end of the electric wire 2. The round terminal 8 and the large-dimension portion are not covered by the electric wire protection tube 3 and are exposed.

An outer dimension 53 of the round terminal 8 in a direction perpendicular to the electric wire 2 is larger than an inner dimension D1 (i.e., a diameter of the trough 32) of the electric wire protection tube 3 of the shape-memory shape. This round terminal 8 corresponds to "large-dimension portion" in claims. An outer dimension of the above-described large-dimension portion in the direction perpendicular to the electric wire 2 is also larger than the inner dimension D1 of the electric wire protection tube 3 of the shape-memory shape. Thus, the electric wire 2 that is being connected to the round terminal 8, i.e., the large-dimension portion, cannot be passed inside the electric wire protection tube 3 of the shape-memory shape even by e.g., changing an angle of the round terminal 8, i.e., the large-dimension portion.

Similarly to the first embodiment, a method of manufacturing the wire harness 1B is a method of mounting the electric wire protection tube 3 on the electric wire 2 that has been connected to the round terminal 8, i.e., the large-dimension portion, in other words, it is a method of mounting the electric wire protection tube 3 afterword.

In this embodiment also, similarly to the first embodiment, the electric wire protection tube 3 is expanded such that the inner dimension thereof becomes larger than the outer dimension of the round terminal 8, i.e., the large-dimension portion, to mount the electric wire protection tube 3 on the electric wire 2. After the electric wire protection tube 3 is mounted on the electric wire 2, the electric wire protection tube 3 is heated again to a temperature equal to or higher than the glass-transition point so it is restored to the shape-memory shape.

Third Embodiment

Figure 12:
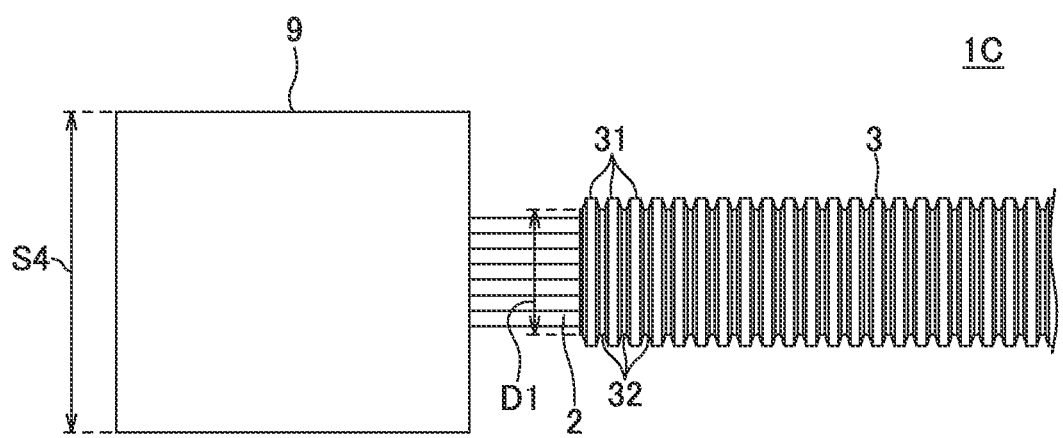
FIG. 12 is a plan view of a wire harness according to a third embodiment of the present invention.

A wire harness and a method of manufacturing the wire harness according to a third embodiment of the present invention will be described with reference to FIG. 12. In FIG. 12, the same elements as the first embodiment described above are provided with the same reference signs and explanations thereof are omitted.

A wire harness 1C shown in FIG. 12 is a wire harness configured to be wired to a vehicle. The wire harness 1C includes a group of electric wires 2, an electric wire protection tube 3 covering the group of electric wires 2, an electric connection box 9 connected to one end of the group of electric wires 2, and a large-dimension portion not shown provided on the other end of the group of electric wires 2. The electric connection box 9 and the large-dimension portion are not covered by the electric wire protection tube 3 and are exposed.

The electric connection box 9 includes a case made of synthetic resin and components such as a relay and a fuse mounted on the case.

An outer dimension S4 of the electric connection box 9 in a direction perpendicular to the electric wire 2 is larger than an inner dimension D1 (i.e., a diameter of the trough 32) of the electric wire protection tube 3 of the shape-memory shape. This electric connection box 9 corresponds to "large-dimension portion" in claims. An outer dimension of the above-described large-dimension portion in the direction perpendicular to the electric wire 2 is also larger than the inner dimension D1 of the electric wire protection tube 3 of the shape-memory shape. Thus, the group of electric wires 2 that is being connected to the electric connection box 9, i.e., the large-dimension portion, cannot be passed inside the electric wire protection tube 3 of the shape-memory shape even by e.g., changing an angle of the electric connection box 9, i.e., the large-dimension portion.

Similarly to the first embodiment, a method of manufacturing the above-described wire harness 1C is a method of mounting the electric wire protection tube 3 on the group of electric wires 2 that has been connected to the electric connection box 9, i.e., the large-dimension portion, in other words, it is a method of mounting the electric wire protection tube 3 afterward.

In this embodiment also, similarly to the first embodiment, the electric wire protection tube 3 is expanded such that the inner dimension thereof becomes larger than the outer dimension of the electric connection box 9, i.e., the large-dimension portion, to mount the electric wire protection tube 3 on the group of electric wires 2. After the electric wire protection tube 3 is mounted on the group of electric wires 2, the electric wire protection tube 3 is heated again to a temperature equal to or higher than the glass-transition point so it is restored to the shape-memory shape.

Fourth Embodiment

Figure 13:
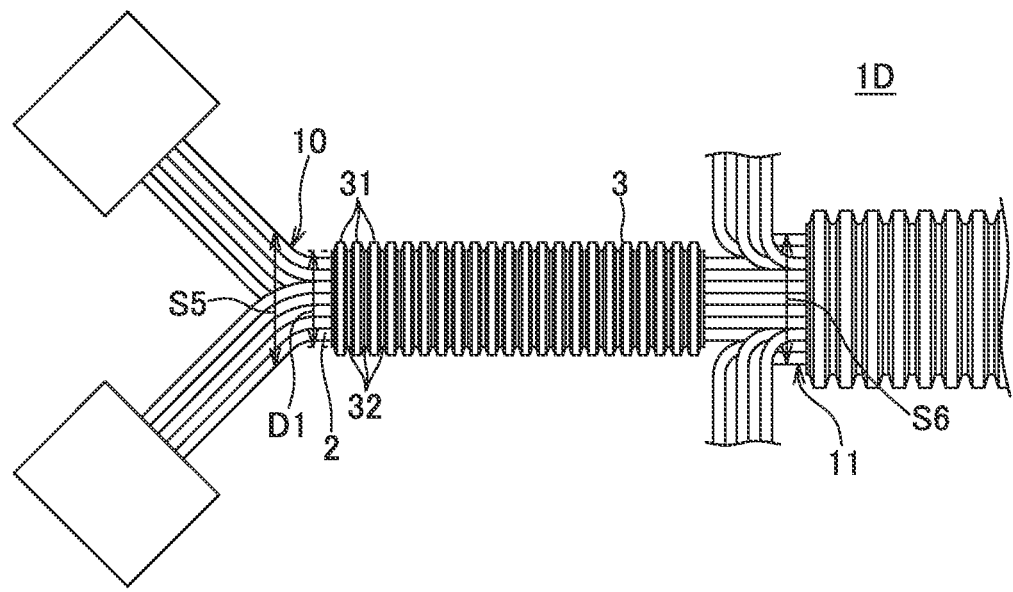
FIG. 13 is a plan view of a wire harness according to a fourth embodiment of the present invention.

A wire harness and a method of manufacturing a wire harness according to a fourth embodiment of the present invention will be described with reference to FIG. 13. In FIG. 13, the same components as the first embodiment described above are provided with the same reference signs and explanations thereof are omitted.

A wire harness 1D shown in FIG. 13 is a wire harness configured to be wired in the vehicle. The wire harness 1D includes a group of electric wires 2 and an electric wire protection tube 3 covering said group of electric wires 2. The group of electric wires 2 is provided with branch portions 10, 11, and the electric wire protection tube 3 is mounted on a part between the branch portion 10 and the branch portion 11.

Dimensions S5, S6 of the branch portions 10, 11 in a direction perpendicular to the electric wire protection tube 3 are larger than an inner dimension D1 (i.e., a diameter of the trough 32) of the electric wire protection tube 3 of the shape-memory shape. Such group of electric wires 2 cannot be passed inside the electric wire protection tube 3 of the shape-memory shape even by bending or twisting it because the branch portion 10 side or the branch portion 11 side is caught by the electric wire protection tube 3. The branch portion 10, 11 corresponds to "large-dimension portion" in claims.

A method of manufacturing the wire harness 1D is a method of mounting the electric wire protection tube 3 on the group of electric wires 2 that has been provided with the branch portions 10, 11 and that has been connected to connectors or the like, in other words, it is a method of mounting the electric wire protection tube 3 afterward.

In this example also, the electric wire protection tube 3 is expanded and mounted on the group of electric wires 2. The electric wire protection tube 3 is expanded to a size that allows a part of the group of electric wires 2 ahead of the branch portion 10 (i.e., a part on an opposite side of the branch portion 11) or a part of the group of electric wires 2 ahead of the branch portion 11 (i.e., a part on an opposite side of the branch portion 10) to be passed inside the electric wire protection tube 3. Subsequently, the electric wire protection tube 3 is heated again to a temperature equal to or higher than the glass-transition point and so it is restored to the shape-memory shape.

The embodiments described above are only representative embodiments of the present invention, and the present invention is not limited thereto. That is, those skilled in the art can carry out various modifications according to conventionally known knowledge without departing from the gist of the present invention. Such modifications, as long as they have the configuration of the present invention, are still within the present invention.

LIST OF REFERENCE SIGNS 1A, 1B, 1C, 1D wire harness
2 electric wire
3, 3B, 3C, 3D, 3E, 3F, 3G, 3H electric wire protection tube
4A, 4B connector (large-dimension portion)
8 round terminal (large-dimension portion)
9 electric connection box (large-dimension portion)
10, 11 branch portion (large-dimension portion)

What is claimed is:

1. A method of manufacturing a wire harness that includes an electric wire and an electric wire protection tube covering the electric wire, one end side of the electric wire being provided with a large-dimension portion having a dimension larger than an inner dimension of the electric wire protection tube,
the method comprising mounting the electric wire protection tube on the electric wire via steps, performed in a sequence set forth, of:
providing a shape-memory polymer having shape-memory properties;
shaping the shape-memory polymer having said shape-memory properties into a tube shape to form the electric wire protection tube;
expanding the electric wire protection tube which is heated to a temperature equal to or higher than a glass-transition point such that the inner dimension of the electric wire protection tube becomes larger than the dimension of the large-dimension portion;
while the electric wire protection tube is in an expanded state, cooling the electric wire protection tube to a temperature below the glass-transition point and solidifying the electric wire protection tube;
mounting the electric wire protection tube on the electric wire by passing the large-dimension portion and the electric wire inside the electric wire protection tube; and
reheating the electric wire protection tube to a temperature equal to or higher than the glass-transition point such that the electric wire protection tube is restored to the inner dimension obtained after the step of shaping.

2. The method according to claim 1, wherein
in the step of expanding, the electric wire protection tube is expanded by blowing compressed air in the electric wire protection tube.

3. The method according to claim 1, wherein
in the step of expanding, an expander is inserted into the electric wire protection tube, and the expander is moved to expand the electric wire protection tube.

* * * * *